(12) United States Patent
Cave et al.

(10) Patent No.: US 8,380,511 B2
(45) Date of Patent: Feb. 19, 2013

(54) SYSTEM AND METHOD FOR SEMANTIC CATEGORIZATION

(75) Inventors: Ellis K. Cave, Plano, TX (US); Mithun Balakrishna, Dallas, TX (US); Vincent Mo, Plano, TX (US)

(73) Assignees: Intervoice Limited Partnership, Las Vegas, NV (US); Lymba Corporation, Richardson, TX (US)

( * ) Notice: Subject to any disclaimer, the term of this patent is extended or adjusted under 35 U.S.C. 154(b) by 1596 days.

(21) Appl. No.: 11/676,704

(22) Filed: Feb. 20, 2007

(65) Prior Publication Data

US 2008/0201133 A1 Aug. 21, 2008

(51) Int. Cl.
*G10L 21/00* (2006.01)
(52) U.S. Cl. ......... 704/270; 704/238; 704/240; 704/251
(58) Field of Classification Search .................. 704/270, 704/270.1, 275, 9, 238, 240, 251
See application file for complete search history.

(56) References Cited

U.S. PATENT DOCUMENTS

| | | | | |
|---|---|---|---|---|
| 5,860,063 | A * | 1/1999 | Gorin et al. .................. | 704/257 |
| 6,173,261 | B1 * | 1/2001 | Arai et al. ..................... | 704/257 |
| 6,260,008 | B1 * | 7/2001 | Sanfilippo .......................... | 704/9 |
| 6,510,411 | B1 * | 1/2003 | Norton et al. .................. | 704/254 |
| 2002/0128821 | A1 | 9/2002 | Ehsani et al. | |
| 2002/0196679 | A1 * | 12/2002 | Lavi et al. ..................... | 365/200 |
| 2003/0105634 | A1 * | 6/2003 | Abella et al. .................. | 704/257 |
| 2003/0130841 | A1 * | 7/2003 | Bangalore et al. ............ | 704/231 |
| 2005/0038650 | A1 * | 2/2005 | Bellegarda et al. ........... | 704/231 |
| 2005/0165607 | A1 * | 7/2005 | Di Fabbrizio et al. ........ | 704/256 |
| 2005/0228657 | A1 * | 10/2005 | Chou et al. .................... | 704/225 |
| 2006/0074634 | A1 * | 4/2006 | Gao et al. ........................ | 704/9 |

OTHER PUBLICATIONS

Gorin et al. "How May I help you?", Speech Communication, vol. 23, pp. 113-127, published in 1997.*
Martin et al. "Algorithm for bigram and trigram word clustering", Speech communication vol. 24, pp. 19-37, published in 1998.*
"Higher Level Phonetic and Linguistic Knowledge to Improve ASR Accuracy and its Relevance in Interactive Voice Response Systems", Article by Mithun Balakrishna, Dan Moldovan, Ellis K. Cave, American Association for Artificial Intelligence, Copyright © 2005, 8 pgs.
"Lexical Chains for Question Answering", Article by Dan Moldovan and Adrian Novischi, University of Texas at Dallas, 7 pgs, Pub. Date 2002.
Fellbaum, Christine, "WordNet an Electronic Lexical Database", The MIT Press, Cambridge, Massachusetts, © 1998 Massachusetts Institute of Technology, pp. 1-423.

(Continued)

*Primary Examiner* — Jialong He
(74) *Attorney, Agent, or Firm* — Frost Brown Todd LLC

(57) ABSTRACT

There is disclosed a system and method for automatically performing semantic categorization. In one embodiment at least one text description pertaining to a category set is accepted along with words that are anticipated to be uttered by a user pertaining to that category set; lexical chaining confidence score is attached to each pair matched between the anticipated words and the accepted text description. These confidence scores are used subsequently by a categorization circuit that accepts a text phrase utterance from an input source along with a category set pertaining to the accepted utterance. The categorization circuit, in one embodiment, creates word pairs matched between the accepted text phrase utterance and the accepted category set. From these word scores, the category pertaining to the utterance is determined based, at least in part, on the assigned lexical chaining confidence scores as previously determined.

16 Claims, 2 Drawing Sheets

OTHER PUBLICATIONS

Mithun Balakrishna, Cyril Cerovic, Dan Moldovan, Ellis Cave: "Automatic Generation of Statistical Language Models for Interactive Voice Response Applications" Interspeech 2006, ICSLP, Ninth International Conference on Spoken Language Processing, Sep. 17, 2006, pp. 1898-1901, XP002480740 Pittsburgh (USA).

Cave E K et al: "Efficient Grammar Generation and Tuning for Interactive Voice Response Applications" Acoustics, Speech and Signal Processing, 2006. ICASSP 2006 Proceedings. 2006 IEEE International Conference on Toulouse, France May 14-19, 2006, Piscataway, NJ, USA, IEEE, Jan. 1, 2006, pp. I-I, XP031100488 ISBN: 978-1-4244-0469-8.

Balakrishna M et al: "Automatic Creation and Tuning of Context Free Grammars for Interactive Voice Response Systems" Natural Language Processing and Knowledge Engineering, 2005. IEEE NLP-KE '05. Proceedings of 3005 IEEE International Conference on Wuhan, China Oct. 1-30, 2005, Piscataway, NJ, USA, IEEE, Oct. 30, 2005, pp. 158-163, XP010896920 ISBN: 978-0-7803-9361-5.

European Search Report issued for European Application 08250594.2-2225; Dated Jun. 2, 2008; 9 Pages.

* cited by examiner

SYSTEM AND METHOD FOR SEMANTIC CATEGORIZATION

CROSS-REFERENCE TO RELATED APPLICATIONS

The present application is related to commonly assigned U.S. patent application Ser. No. 11/522,107, filed Sep. 14, 2006, entitled "AUTOMATIC GENERATION OF STATISTICAL LANGUAGE MODELS FOR INTERACTIVE VOICE RESPONSE APPLICATIONS", the disclosure of which is hereby incorporated herein by reference.

TECHNICAL FIELD

This invention relates to semantic categorization and more to a system and method for categorizing text phrases or sentences into specific pre-defined categories.

BACKGROUND OF THE INVENTION

A semantic categorizer accepts text phrases or sentences as input, analyzes them and places each input text in a specific category. In some cases, a specific input text phrase can be placed in one or more categories, with confidence scores for each placement. Semantic categorization is a key component in most dialog systems. For example, Interactive Voice Response (IVR) systems must interpret a user's spoken response to a prompt in order to then complete an action based on the response.

Currently, in fixed-grammar directed-dialog systems, semantic categorization is performed using a set of manually defined rules. A dialog developer pre-defines those utterances that the system should be capable of "understanding". These pre-defined utterances are called "grammars". Each pre-defined utterance is assigned to a semantic category, and that semantic category is indicated by including a semantic tag with the grammar definition. Thus semantic categorization is labor intensive and requires significant manual involvement to develop grammars and define semantic tags for each new application or prompt. Using existing approaches, dialogs are fairly restrictive, since they must always remain within the scope of the pre-defined responses.

In open ended (non-directed) applications, that use prompts such as, for example, of the type, "How may I help you?", users speak utterances intended to select one of a list of the tasks that are available in the application. Often these task choices are not pre-identified (directed) to the speaker so a user can say almost anything in response to the prompt. Automatic speech recognizers (ASRs) use Statistical Language Models (SLM) to transcribe the user's utterance into a text message. This transcribed text is then passed to a categorization engine to extract the semantic choice that the user is requesting. The above-identified patent application is directed to the automatic generation of SLMs, for example, for use with an ASR to generate text transcriptions of a user's utterance.

After a text transcription is available, the next task is to make that text understood by a machine. For example, if the user says, "I want my bank balance", the ASR in the IVR would use the SLM created by the above-identified patent application to generate text that says, "I want my bank balance". The text of the utterance then needs to be understood by the machine and mapped to a semantic category "bank_balance".

By restricting the scope of a dialog to a specific domain such as "banking", the accuracy and speed of generating the text transcription of spoken utterances is greatly improved. For this reason, many IVR applications assume that all user utterances will fall within the domain of that application. Utterances that have nothing to do with the application will not be transcribed accurately and will be assigned a low confidence score. For example, if a user calls a bank and says, "I want flight information to California," an SLM system will transcribe that to some nonsensical sentence with a very low confidence level, because that question is an improper domain for a banking application and the SLM could not handle words out of its domain. The low confidence score level indicates that the utterance is probably not transcribed correctly, and further clarification is required. Therefore, normally, the proper domain must be known by the user or selected as a starting point. In a typical application, the overall domain is known, since if the user is calling, for example, a bank, it would be a banking domain.

Within a specific domain there are a number of category sets or available tasks that can be performed by the application. There are many ways a user can invoke a task. A task can be requested by a command: "Tell me how much I have in my checking account" or a question, "How much money do I have in my account?" There are typically a large number of utterances that a user can use to invoke any specific task in an application.

The job of a semantic categorizer is to discover the specific task that a user is requesting, no matter how it is requested. This process is typically done in two steps, with the first step transcribing the user's utterance into text. An improved method for this transcription process is described in the above-identified application.

Once the user's utterance is successfully transcribed, the text transcription must be analyzed to determine the user's intentions. One aspect of this process is discussed in a paper published in 2005 in the AAAI SLU workshop entitled "*Higher Level Phonetic and Linguistic Knowledge to Improve ASR Accuracy and its Relevance in Interactive Voice Response System*," which is incorporated by reference herein.

BRIEF SUMMARY OF THE INVENTION

There is disclosed a system and method for automatically performing semantic categorization. In one embodiment at least one text description pertaining to each category in a category set is accepted; lexical chaining confidence score is attached to each word in the category text description being semantically paired with another word which is at most "n" semantic relations away in WordNet. For example, if "bank" is a word in the category description for the category "Account Balance" and "n" is equal to 3, we extract all the words which are at most 3 semantic relations away from the word "bank" in WordNet and associate a lexical chaining confidence score between "bank" and each of these extracted words. This confidence scores database is used subsequently by a categorization algorithm that accepts a user text utterance from an input source along with a category set and their corresponding text descriptions pertaining to the IVR dialog state. The categorization algorithm, in one embodiment, extracts word pairs matched between the input user text utterance and the IVR dialog state category set descriptions using the lexical chain confidence scores database. From these word pairs, the category pertaining to the user utterance is determined based, at least in part, using the collected lexical chaining confidence scores as previously determined.

The foregoing has outlined rather broadly the features and technical advantages of the present invention in order that the Detailed Description of the Invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with farther objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
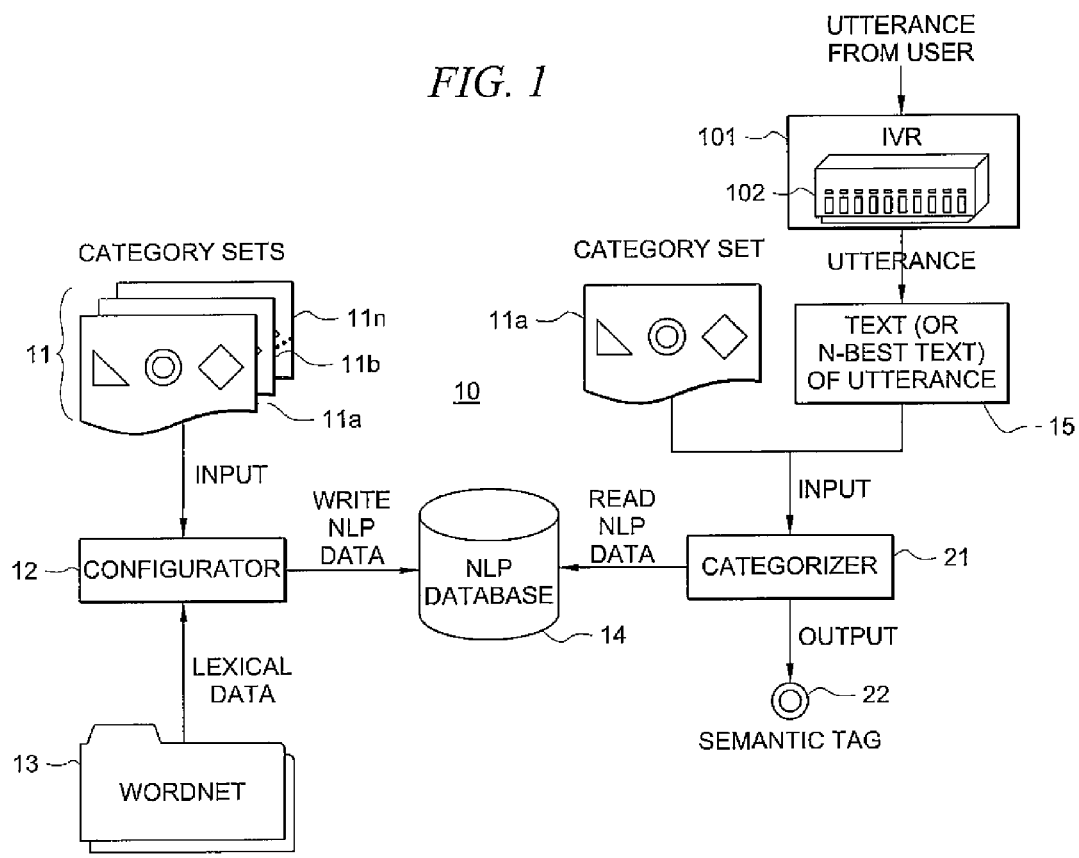
FIG. 1 shows one embodiment of an architecture in accordance with the present invention.

FIG. 1 shows one embodiment 10 of an architecture for performing the concepts of the invention. Note that the semantic categorizer shown in FIG. 1 is divided into two sets of processes. One set is the off-line processes, which includes everything to the left of database 14, and the other set which includes the on-line processes, everything to the right of database 14. The off-line processes are applied before the application is started, and may run for a lengthy period. The goal of the off-line processes is to generate data (word pairs and lexical chain confidence scores) to be stored in database 14 in a format that will allow fast categorization during a real-time dialog process. Once the database has been created, the on-line processes must work in near-real-time on user utterances, to prevent delays in the user's dialog with the system. Generally, the ASR and semantic categorizer must yield an answer to what task the user has requested, within a few tenths of a second, to make the dialog flow smoothly.

Shown in FIG. I is category sets 11 which consists of a plurality (11a-11n) of category sets, each set containing one or more text descriptions for each category or text within a category set. For example, let's say we have a prompt, "Do you want your account balance, cleared checks or transfer money?" The category set for this particular prompt contains three categories, a category for "account balance", one for "cleared checks", and one for "transfer money". Each category has at least one text description of that category, which the semantic categorizer will use as the information to categorize the various possible answer utterances. In order to create each category description, the speech application designer formulates a text description of each category in the set into a file in sentence format (Process 301, FIG. 3). Thus for each dialog state/prompt in the IVR call-flow, that speech application designer will create a category set and at least one description for each semantic category in the category set. All these category sets defined by the speech application designer for a particular IVR application are incorporated into category sets 11 (11a-11n), are then presented to configurator 12 along with a lexical data source like WordNet. For example, a small banking IVR might contain three different dialog states/prompts. State 1 "Check Account Balance, Check Cleared Checks, Transfer Money"; State 2 "Savings Account, Checking Account"; and State 3 "Electronic Transfer, Money Order". Each of these states/prompts has a well-defined semantic category set which is created by the speech application designer. Once the designer defines the semantic category set for each dialog state/prompt, the designer writes at least one description for each of the semantic categories in each of the IVR category sets. For a category, such as "Transfer Money", the designer would write a description of the money transfer process, defining the task related to moving money from one place to another. For "Check Cleared Checks", the designer might write that the user can check the number of cleared checks in the past week. Other sentences would also be written pertaining to a description of this activity (process 301, FIG. 3). The category sets from the IVR dialog prompt/states 1, 2, and 3 form category sets 11 (11a, 11b, and 11c).

Figure 3:
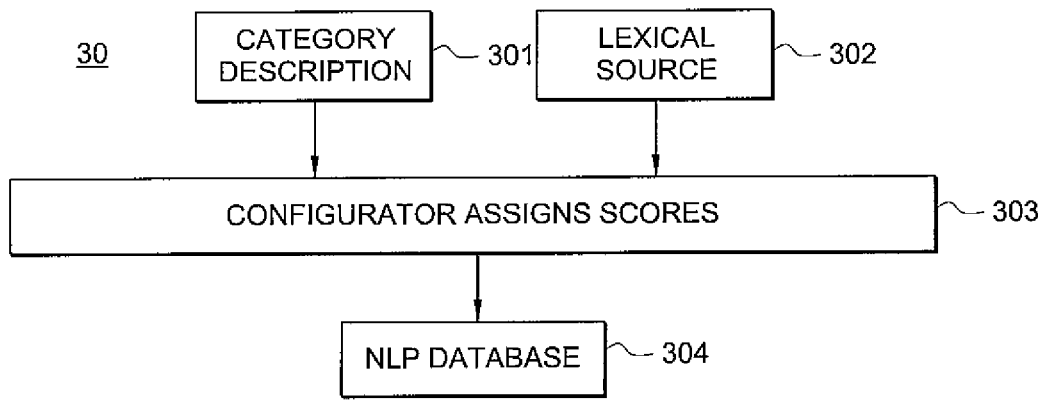
FIGS. 3 and 4 illustrate one embodiment of a process for performing the method of the invention.

Configurator 12 accepts two inputs, one from the designer and another from a lexical database, such as, for example, WordNet 13 (process 302, FIG. 3). WordNet, such as described by C. Fellbaum in the MIT Press 1998, of which is incorporated herein by reference, is a well known database containing English words along with information about each word such as the synonyms for each one of the words (concepts) and the relations of those concepts to other concepts in the database. A description for each concept is also included and this information attached to each concept is called a "gloss". WordNet contains open class words like nouns, verbs, adverbs and adjectives grouped into synonym sets. Each synonym set or WordNet synset represents a particular lexical concept WordNet also defines various relationships that exist between lexical concepts using WordNet semantic relations. For example, the lexical database will yield for "cellular phone", as a concept, the different synonyms for cellular phone, such as cell, cellphone, mobile phone, and cellular telephone. It also has a gloss which states that the "cellular phone" concept is "a hand-held mobile radiotelephone for use in an area divided into small sections, each with its own short-range transmitter/receiver". WordNet also has a hierarchy. For example, it knows that "cellular phone" is related to the concept "radiotelephone radiophone, wireless telephone—a telephone that communicates by radio waves rather than along cables" so "radiotelephone, radiophone, wireless telephone" concept is a parent of "cellular phone". Going one more level up, we can see that "cellular phone" is related to the concept "telephone, phone, telephone set— electronic equipment that converts sound into electrical signals that can be transmitted over distances and then converts received signals back into sounds", so "telephone, phone, telephone set" concept is the grand-parent of "cellular phone". In this manner, all of the words in English are connected together by their semantic relations. Configurator 12 takes each category set from 11a through 11n and for each word in the designer written description of each category, it extracts a set of words/concepts that are at most "n" semantic relations away from that particular category description word in WordNet. A confidence score is also associated with each of these extracted word pairs. D. Moldovan and A. Novishi in their paper entitled, "*Lexical Chains for Question Answer-*

*ing"*, published in Proceeding of Coling, 2002 (hereinafter "Moldovan"), of which is incorporated herein by reference, present a methodology for finding topically related words by increasing the connectivity between WordNet synsets (synonym set for each concept present in WordNet) using the information from WordNet glosses (definition present in WordNet for each synset). Thus we can determine if pairs of words are closely related by not only looking at the WordNet synsets but also by finding semantic relation paths between the word pair using the WordNet synsets and glosses. Configurator 12 uses such a lexical chain process to find all words which are related to a category description word by less than "n+1" semantic relations. A confidence score is also associated with a related word pair by the lexical chain process based on the distance of the words from each other. This set of word pairs, their corresponding relationship chains, and lexical chain confidence scores is sent to Natural Language Processing (NLP) database 14 (process 304, FIG. 3).

Database 14 could store the relationship in any know data format. This could be a flat file or it could be an RDBMS in a database management system. The NLP database contains a set of word concept pairs along with the lexical chain weight associated with each concept pair. For example, for the pair of words such as "balance" and "account" the weight might be 50 or 60. The score indicates a high degree of semantic similarity between the words. This is in contrast to a word pair such as "eat" and "shoe" which have a much lower score and hence have a low semantic similarity between them.

Figure 4:
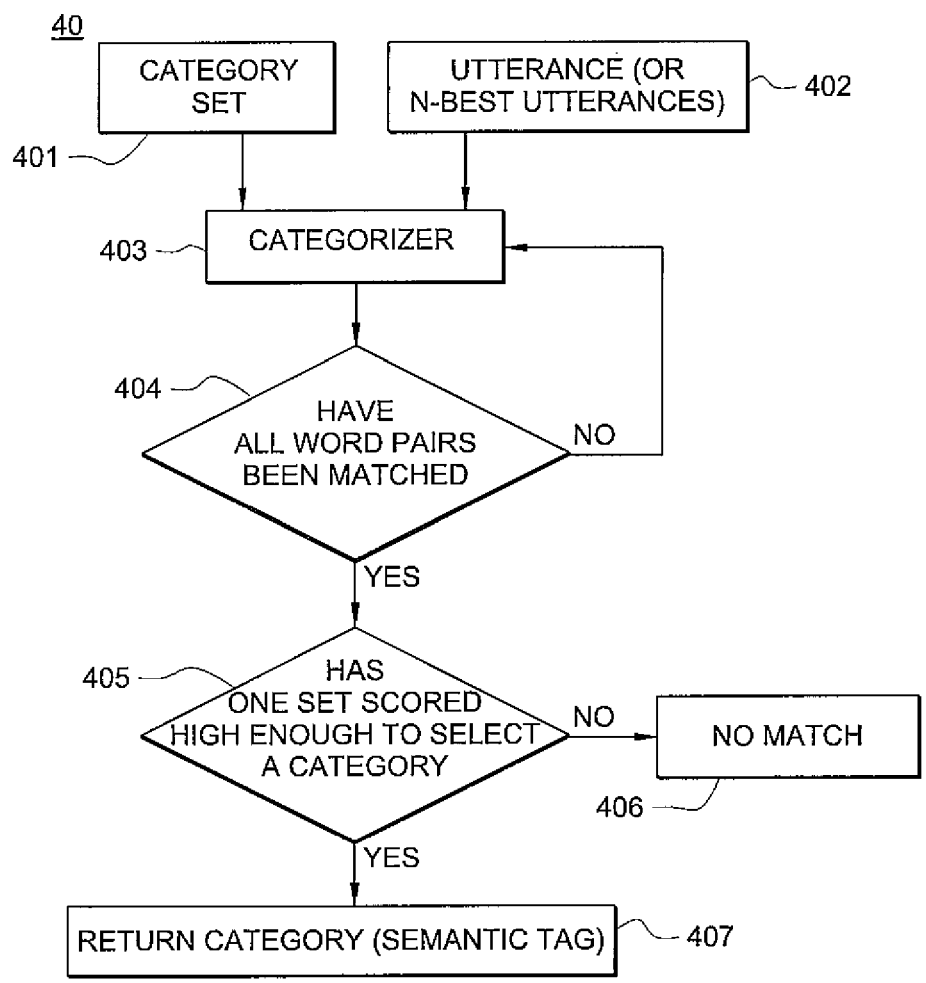

When it is desired to translate an utterance into a particular semantic category or task, categorizer 204 (process 403, FIG. 4) accepts as input the text, such as text 15 (process 402, FIG. 4) as recognized by ASR 101, and using the known category set (process 401, FIG. 4) (such as category set 11*a*) for the IVR dialog state identifies the matching word pairings (words in the user utterance text against words in each category descriptions from 11*a*). The previously generated (off-line) NLP database 14 is used to find if a word pair is semantically related and also to identify the confidence score for such a match.

Database 14 then provides a listing of all the required word pairs (along with the lexical chain scores previously calculated for each such word pair) for the given category sets. Every word in the input user text 15 is paired with every word in the description(s) for a particular semantic category in 11*a*, the categorizer 204 then associates a categorization confidence score for such a (user text, semantic category) pair by summing up the lexical chain confidence score associated with every valid word pair (using the NLP database to not only detect the validity of a particular word pair but also to find the corresponding semantic similarity score). The assumption then is that the highest categorization confidence score (total lexical confidence score normalized with the number of valid word pair numbers) for a particular category (given all the words in the transcribed utterance) indicates the proper category for that user utterance. Process 404 checks to see that all word pairs (concepts) have been given a score and when they have, checks if all the categories in category set 11*a* have been assigned a categorization confidence score for that particular user text utterance. Process 405 determines if it has enough separation (based on categorization confidence score for each category in set 11*a*) and if the scoring is high enough, to declare a winner. If not, process 406 returns a "no match" condition. Depending on the dialog system, this could result in the system asking the user for clarification, or various other dialog error-handling processes can be invoked. If a "winner" is determined, process 407 provides that information.

For example, assume a particular prompt which asks, "How may I help you?" with the available tasks "checking your account balance", "checking cleared checks", or "transferring money". If we also assume that the user utters, "I want to check my account balance". The text from the ASR for that particular user utterance would say, "I want to check my account balance". We need to match this utterance transcription against each one of the available categories. Of course, the best match is the task of getting the account balance. Therefore the category tag coming out of the categorizer would be "account balance". Now let's take an example where the utterance of the user does not completely match the category description or the category set. For example, in response to the prompt of this example, the user says, "I want the total in my account". This utterance does not exactly match with any of the semantic activity descriptions completely but the categorization confidence score would be higher for the tag (or category) of "account balance" than it would be for the category of "money transfer" or "cleared checks". This is due to the high semantic similarity between user utterance transcription and the category description for the task "account balances" than for the category of "money transfer" or "cleared checks". Hence the category tag coming out of the categorizer would be "account balance".

Now let's take an example where the utterance of the user does not match any of the category description or the category set. For example, in response to the prompt of this example, the user says, "I want to cancel my credit card". This utterance does not match with any of the semantic activity descriptions. This is due to the low semantic similarity between user utterance transcription and all the category descriptions. Hence the category tag coming out of the categorizer would be "no match".

Figure 2:
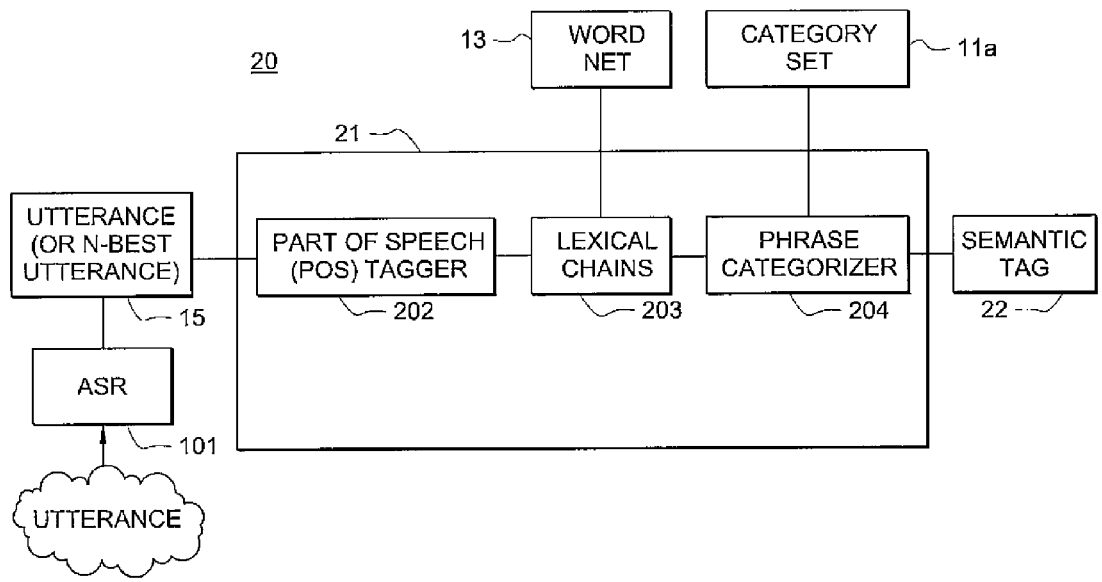
FIG. 2 shows one embodiment of a categorizer for use in the embodiment of FIG. 1.

FIG. 2 shows one embodiment 20 of a categorizer without the use of the NLP database. As discussed above, a text version of the user's utterance is presented to part of speech (POS) tagger 202. In some cases, the ASR cannot transcribe the utterance with perfect accuracy, so it will provide a list of 5 or 6 or 10 transcriptions, for each user spoken utterance that are close based upon the SLMs. These are called the N-best utterances. These utterances are provided to part of speech (POS) tagger 202. POS 202 determines the part of speech for each word in the utterance text(s). For example, POS 202 determines if a word is a preposition or a noun or any other part of speech. This helps determine how well the word pairs are related. For example, when the user says, "bank", in a banking domain, the word could be noun like as a "financial institution" in "bank account", or it could mean a verb like "deposit: in "bank my checks". When "bank" is used in a power catalog domain, it would mean "bank of batteries". Thus, it is important that the system determine for each word which part of speech and which sense it denotes. This then helps lexical chain 203 find the relationship between a pair of words. The output from POS tagger goes to lexical chain application 203 which uses WordNet to help determine the actual relationship between the word pairs. This then, for example, says that "account" and "balance" are related and gives the score. For example, "account" the noun for an account has word sense No. 1 is related to the noun form of "balance" with word sense No. 2. These are the scores which are actually put into the NLP database as discussed in FIG. 1.

Phrase categorizer 204 receives a large number of word paths and their scores. For example when the user says, "I want to check the total in my account," categorizer 204 receives for each content word (which can be a noun, verb, adjective or adverb) a lexical chain with each word in the description given by the system designer. These descriptions, as discussed above, are present in each category set. Categorizer 204 finds the score between each one of these words and picks the best lexical chain.

In one embodiment, the best lexical chain is determined by the maximum confidence associated by the lexical chain program with the word pairs. For example, as between the words {"total" (the utterance), "balance"} and {"total", "transfer"} the score is highest for the first pair and thus that lexical chain is selected, yielding a tag (or category) N=check balance. This mapping is performed for all pairs to select the right (highest score) semantic.

In case the input to the categorizer (process 21 in FIG. 1, or process 403 in FIG. 4) is an n-best list of transcriptions (process 15 in FIGS. 1 and 2, or process 402 in FIG. 4) for a particular user utterance, a majority voting algorithm is invoked to determine the best semantic category for that user utterance. In some cases the ASR cannot transcribe the utterance with perfect accuracy, so using a list of 5 or 6 or 10 transcriptions for each user spoken utterance that are close based upon the ASR language and acoustic models, can give a better categorization result than using just the first best ASR transcription for categorization. The process of categorization, described above for matching a single user input text to a particular category from a set of predefined categories, is repeated for each one of the transcriptions in the n-best list provided by the ASR. This results in a pre-defined category or "no-match" category being assigned to each one of the ASR n-best list transcriptions for a particular user utterance. We then pick the category assigned to the majority of the ASR n-best list transcriptions as the semantic category for that particular user utterance.

Note that the processes discussed herein could run, for example, on processor 102, FIG. 1, contained in IVR 101 or separate processors (not shown) can be used for each process. For example, categorizer 21 and configurator 12 could use the same processor or they could use separate processors as desired. One configuration could be as shown in the above-identified patent application where the configuration process (process 30, FIG. 3) could be combined with the sum generation process.

The paper entitled "Higher Level Phonetic and Linguistic Knowledge to Improve ASR Accuracy and its Relevance in Interactive Voice Response Systems" (hereinafter "AutoCFGTuning") published in 2005 at the AAA1 SLU workshop, which is incorporated by reference herein, described a semantic categorizer for the purpose of automatically tuning IVR grammars. Unlike the present invention, which relies only on the category descriptions to perform semantic categorization, the "AutoCFGTuning" semantic categorization process used the information present in the IVR grammars (to be tuned) for categorizing user utterances into the semantic categories. Thus, the "AutoCFGTuning" semantic categorization process has more information at its disposal to perform categorization and hence the semantic categorization algorithm is stricter (requires each word in the user utterance to map to at least one word from the grammar entry for a particular semantic category). The semantic categorization process in the present invention relies only on a single sentence (and sometimes more than once) description provided by the system designer to perform the categorization and hence semantic categorization algorithm is less strict (relying on the lexical chain semantic similarity score thresholds rather than having strict rules on the number of valid lexical chain based word mappings required.)

Also, the "AutoCFGTuning" semantic categorization process is an offline process (since the overall purpose is IVR grammar tuning and this can be done in an offline manner).

Thus, speed of categorization is not an issue in the "AutoCFGTuning" semantic categorization process and hence is not addressed. Semantic categorization is a key component in most dialog systems. The IVR systems must interpret a user's spoken response to a prompt and then complete an action based on the response with the minimum of delays. Hence, the semantic categorization process described in the present invention needs to be used in an online process and the user's spoken response to a prompt needs to be categorized into one of the predefined semantic categories with high speed. The use of the configurator (process 12) to create the NLP database 14 with all the required information (the calculation of the word pair similarity score is the bottleneck and takes the majority of the categorization processing time) and takes care of the speed issue in the semantic categorizer (process 21) for calculating the similarity measure between the words in the description and in the user utterance.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   a) creating a set of text descriptions, wherein the set of text descriptions comprises, for each category in a category set, a corresponding text description for the category;
   b) accepting the set of text descriptions;
   c) identifying each word from a lexical data source which is related to a word in the set of text descriptions by less than a threshold number of semantic relations;
   d) creating a build time set of word pairs, each word pair from the build time set of word pairs comprising a word from the identified words from the lexical data source and a word from the set of text descriptions;
   e) using, without human intervention, a processor to assign lexical chaining confidence scores to each word pair from the build time set of word pairs;
   f) accepting a text statement from an input source;
   g) creating a run time set of word pairs, each word pair from the run time set of word pairs comprising a word from the accepted text statement, and a word from the set of text descriptions; and
   h) determining at least one category corresponding to the accepted text statement based, at least in part, on said assigned lexical chaining confidence scores for word pairs from the build time set of word pairs corresponding to word pairs from the run time set of word pairs.

2. The method of claim 1 wherein said assigned confidence scores are stored in a natural language processing (NLP) database.

3. The method of claim 2 wherein said determining comprises: accessing said NLP database for said confidence scores.

4. The method of claim 1 wherein:
a) creating the run time set of word pairs comprises, for each category in the category set, pairing each word from the accepted text statement with each word from the text description corresponding to the category set;
b) determining at least one category corresponding to the accepted text statement comprises:
 i) for each category in the category set, creating a categorization confidence score by combining the lexical chain confidence scores for word pairs from the build time set of word pairs which correspond to word pairs from the run time set of word pairs created by pairing a word from the accepted text statement with a word from the text description corresponding to the category; and
 ii) identifying the category from the category set with the highest categorization confidence score.

5. The method of claim 1 wherein using the processor to assign lexical chaining confidence scores comprises: accessing a lexical database.

6. The method of claim 1 wherein said text statement is derived from an audio response using automatically generated statistical language models (SLMs).

7. A system comprising:
a) a configurator configured to:
 i) accept at least one text description pertaining to a category set, wherein the at least one text descriptions comprises, for each category in the category set, a corresponding text description for the category, wherein the corresponding text description comprises one or more sentences describing the category;
 ii) accept words that are anticipated to be provided as input pertaining to said category set;
 iii) receive lexical data from a lexical data source, said lexical data pertaining to received ones of said accepted words and received ones of words in said at least one text description; and
b) a database for storing lexical confidence scores for use by said configurator based upon word pairs created by said configurator between said anticipated words and said words from said at least one text description, said lexical confidence scores based, at least in part, on lexical data received from said lexical data source;
c) a categorizer configured to:
 i) accept a text statement from an input source;
 ii) accept at least one category set pertaining to said accepted statement, said category set having a plurality of possible categories;
 iii) creating a run time set of word pairs by pairing words in the accepted text statement with words in the corresponding text description for a category from category set; and
 iv) calculate a category confidence score for the category from the category set by summing up lexical confidence scores stored in said database for the word pairs from the run time set of word pairs.

8. The system of claim 7 wherein the categorizer is configured to
use a means for determining a category corresponding to said accepted statement based, at least in part, on said assigned lexical chaining confidence scores between said created word pairs as obtained from said database.

9. The system of claim 8 further comprising the means for determining a category corresponding to said accepted statement based, at least in part, on said assigned lexical chaining confidence scores between said created word pairs as obtained from said database.

10. A system comprising:
a) a categorizer configured to:
 i) accept a text statement from an input source;
 ii) accept at least one category set pertaining to said accepted statement, said category set having a plurality of possible categories;
 iii) use a means for determining at least one category corresponding to said accepted statement based, at least in part, on assigned lexical chaining confidence scores between a set of created word pairs as obtained from a database, said confidence scores derived under control of a configurator;
b) the configurator, wherein the configurator is configured to:
 i) accept:
  at least one text description pertaining to a category in a category set; and
  words that are anticipated to be provided as input pertaining to said category set;
 ii) receive lexical data from a lexical data source, said lexical data pertaining to received ones of said accepted words and received ones of words in said text description; and
 iii) use a means for assigning said lexical chaining confidence scores based upon word pairs between said anticipated words and said words from said text description, said scores based, at least in part, on lexical data received from said lexical data source;
c) the database for storing lexical confidence scores for use by said configurator based upon said word pairs between said anticipated words and said words from said text description, said lexical confidence scores based, at least in part, on lexical data received from said lexical data source.

11. A system comprising:
a) a database;
b) one or more processors; and
c) a configurator, wherein the configurator is programmed to, when run using the one or more processors, perform a plurality of tasks comprising:
 i) accepting one or more of text descriptions, wherein each text description from the one or more text descriptions pertains to a category from a category set, and wherein each text description from the one or more text descriptions comprises one or more sentences describing the category that the text description pertains to;
 ii) using a lexical data source to derive a plurality of related word pairs and a plurality of confidence scores, wherein:
  1) each related word pair from the plurality of related word pairs is associated with a confidence score from the plurality of confidence scores;
  2) the lexical data source comprises a corpus of words, which corpus of words comprises each word from each text description from the one or more text descriptions;
  3) the lexical data source maintains data identifying semantic relations between words from the corpus of words;
  4) using the lexical data source comprises, for each word from the one or more text descriptions:
   identifying each word from the corpus of words which the data identifying semantic relations indicates is separated from the word from the one or more text descriptions by no more than a predetermined number of semantic relations;

for each word from the corpus of words separated from the word from the one or more of text descriptions by no more than the predetermined number of semantic relations, creating a related word pair comprising the word from the one or more text descriptions and the word from the corpus; and associating a confidence score based at least in part on the number of semantic relations separating the word from the corpus and the word from the one or more text descriptions with the related word pair;

iii) storing the plurality of related word pairs and the plurality of confidence scores in the database;

d) a categorizer, wherein the categorizer is programmed to, when run using the one or more processors, perform a plurality of run time tasks comprising:
i) receiving a text representing an input from an external source, wherein the input is associated with a plurality of categories from the category set, and wherein the text comprises one or more input words;
ii) creating one or more input word pairings, wherein each input word pairing comprises an input word from the one or more input words, and a word from a textual description pertaining to one of the plurality of categories associated with the input;
iii) using the plurality of related word pairs stored in the database to determine an input confidence score for each input word pairing;
iv) based at least in part on the input confidence scores, determining a plurality of category confidence scores, wherein each category confidence score corresponds to a category associated with the input; and
v) identifying the input from the external source as matching one of the categories associated with the input, or as being a no match based on the plurality of category confidence scores.

12. The system of claim 11, wherein the categorizer identifies the input from external source as matching one of the categories associated with the input, or as being a no match using a means for categorizing input using the database.

13. The system of claim 11, wherein:
(a) the data identifying semantic relations maintained by the lexical data source comprises semantic relations which can be used to link any two words from the corpus of words into a lexical chain;
(b) identifying each word from the corpus of words which the data identifying semantic relations indicates is separated from the word from the one or more text descriptions by no more than a predetermined number of semantic relations comprises identifying each word from the corpus of words which the data identifying semantic relations indicates can be linked to the word from the one or more text descriptions by a lexical chain having a length of no more than the predetermined number of semantic relations; and (c) the predetermined number of semantic relations is three.

14. A system comprising:
a) a database
b) one or more processors;
c) a categorizer, wherein the categorizer is programmed to, when run using the one or more processors, perform a plurality of tasks comprising:
i) receive one or more text versions of an input from an external source, wherein the input is associated with a plurality of categories, and wherein each of the text versions of the input from the external source comprises one or more input words;
ii) creating one or more input word pairings, wherein each input word pairing comprises an input word from one of the one or more text versions of the input from the external source and a word from a textual description pertaining to one of the plurality of categories associated with the input from the external source, wherein the textual description comprises one or more sentences describing the category which it pertains to;
iii) for each of the one or more input word pairings, determining a maximum lexical chain confidence score based at least in part on a semantic distance between the words from the word pairing as indicated in a lexical data source; wherein the maximum lexical confidence score is determined by finding a best lexical chain from plural lexical chains obtained from the lexical data source;
iv) based at least in part on the maximum lexical chain confidence scores, determining a plurality of category confidence scores, wherein each category confidence score corresponds to a category associated with the input from the external source; and
v) identifying the input from the external source as matching one or more of the associated categories, or as being a no match based at least in part on the plurality of category confidence scores.

15. The system of claim 14, wherein:
a) receiving one or more text versions of the input from the external source comprises receiving a plurality of text versions of a user utterance;
b) the plurality of text versions of the user utterance comprise different potential transcriptions of the user utterance;
c) determining the plurality of category confidence scores comprises, for each category from the plurality of categories:
i) determining a lexical chain confidence score corresponding to that category for each of the one or more text versions of the user utterance; and
ii) using a majority voting algorithm and the lexical chain confidence scores for each of the one or more text versions of the user utterance to determine the category confidence score.

16. The system of claim 14, wherein the categorizer is configured to use a means for categorizing an input without use of a natural language processing database.

* * * * *